Aug. 27, 1940.  F. PORTER  2,212,847
PROCESS FOR THE RECOVERY AND REUTILIZATION OF AMMONIA
AND CARBON DIOXIDE IN UREA SYNTHESIS
Filed Jan. 19, 1939
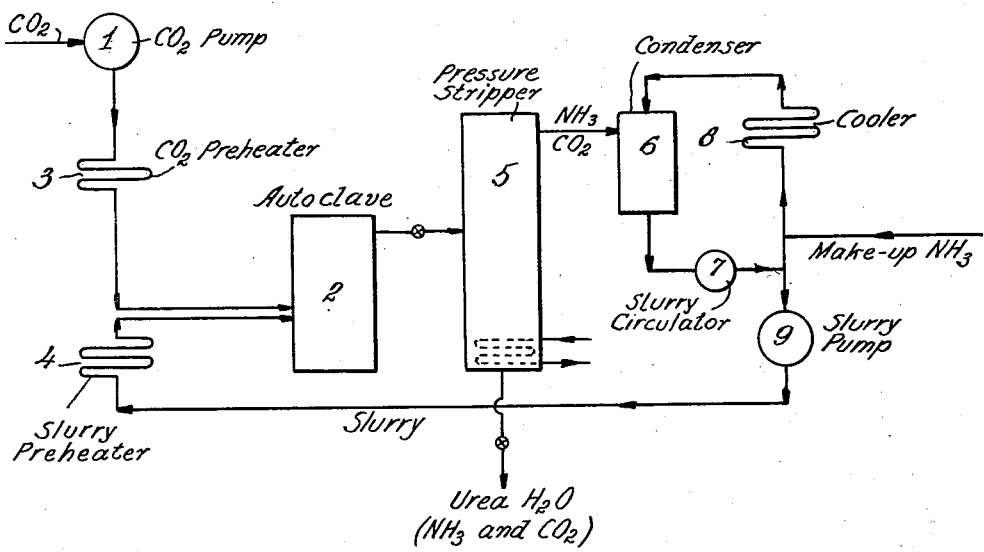
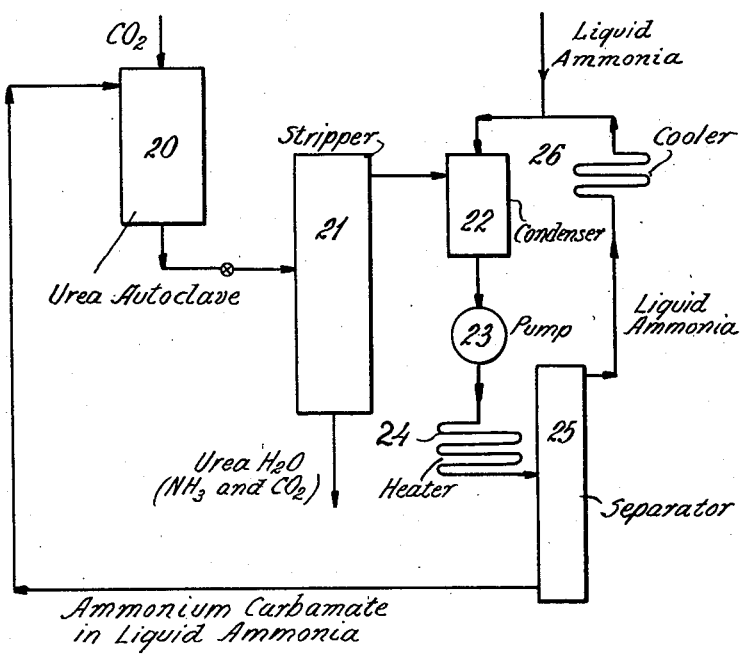
INVENTOR
Frank Porter
BY
ATTORNEY Patented Aug. 27, 1940

2,212,847

UNITED STATES PATENT OFFICE 2,212,847

PROCESS FOR THE RECOVERY AND REUTILIZATION OF AMMONIA AND CARBON DIOXIDE IN UREA SYNTHESIS

Frank Porter, Syracuse, N. Y., assignor to The Solvay Process Company, New York, N. Y., a corporation of New York Application January 19, 1939, Serial No. 251,761

8 Claims. (Cl. 260—555)

This invention relates to a process for synthesis of urea from ammonia and carbon dioxide in which unconverted ammonia and carbon dioxide in the synthesis product are recovered and returned to the high pressure urea synthesis system.

In the operation of a process for synthesis of urea by reaction of ammonia and carbon dioxide in an autoclave at urea-forming temperatures and pressures, conversion of ammonia and carbon dioxide to urea in the autoclave is not quantitative. Liquid effluent withdrawn from the autoclave, therefore, contains unreacted ammonia and carbon dioxide. Recovery of unconverted reactants leaving the autoclave and their return to the autoclave so they may be utilized for the synthesis of urea, constitutes an important problem in urea synthesis, particularly when it is desired to operate a continuous process for production of urea.

Because of the great practical importance of recovering and returning the carbon dioxide and ammonia to the autoclave many attempts have been made to provide an economical, effective method for doing this in a continuous process. It has been proposed to return separately to the autoclave as liquid or compressed vapor the ammonia and carbon dioxide volatilized from the autoclave effluent. Separation of carbon dioxide from ammonia in a mixture of the two, however, is a difficult and costly process. It has also been proposed to condense the ammonia and carbon dioxide mixture volatilized from the effluent to form an ammonium carbamate melt and to return this melt to the autoclave. This method is disadvantageous in that it is difficult to maintain in smooth operation a system for pumping at high temperatures and pressures a molten material which readily solidifies upon cooling and vaporizes upon release of the pressure. Furthermore, the melt is very corrosive towards iron and steel of which the pumps may be readily constructed at the high temperatures required to keep it fluid. It has been proposed to condense the mixture of ammonia and carbon dioxide vapors to form solid ammonium carbamate which is scraped from the condenser, formed into briquets, and thus returned to the autoclave. In continuous operation, however, feeding solid carbamate briquets into an autoclave in which the high pressures used for urea synthesis exist (200 or 300 atmospheres, for example), presents difficulties. It has been further proposed to condense unreacted ammonia and carbon dioxide vaporized from the liquid effluent in water to form an aqueous solution of ammonium carbamate or in a urea-ammonia mixture to form a solution of ammonia and carbon dioxide therein, and to return the solution in either case to the autoclave. The introduction of water or of urea into the autoclave results in materially decreasing the efficiency of the synthesis to urea of the ammonia and carbon dioxide introduced into the autoclave.

I have discovered a mixture of gaseous ammonia and carbon dioxide when cooled to a temperature of 118° C. or below in the presence of liquid ammonia, may be condensed to form a slurry of finely divided solid ammonium carbamate in the liquid ammonia which may be readily pumped under high pressures. I have discovered that by condensing the ammonia and carbon dioxide in the presence of sufficient liquid ammonia so the product formed contains less than 50% ammonium carbamate (i. e., a ratio of carbon dioxide to ammonia equivalent to less than 50% combined carbon dioxide and ammonia calculated as carbamate) the condensed ammonia and carbon dioxide forms a slurry in the liquid ammonia which is sufficiently fluid at ordinary temperatures to be readily pumped from a lower to a higher pressure at which latter pressure the ammonia and carbon dioxide may be introduced into a urea autoclave.

I have discovered the foregoing procedure provides a particularly advantageous method for operation of a continuous process for urea synthesis with recovery and reutilization of the unconverted ammonia and carbon dioxide leaving the autoclave. The liquid effluent from the autoclave, containing synthesized urea and unconverted ammonia and carbon dioxide, is treated in any of the well known methods to vaporize the ammonia and carbon dioxide from the effluent at pressures lower than the urea synthesis pressure, preferably while retaining in the liquid the major proportion of the water which it contains. The vaporized ammonia and carbon dioxide are condensed to form a slurry of solid carbamate in liquid ammonia containing less than 50% carbamate. This slurry is pumped into the high pressure portion of the urea synthesis system and the carbon dioxide and ammonia returned to the urea autoclave for treatment to synthesize urea therefrom. Carbon dioxide and, if desired, ammonia in addition to that contained in the slurry are introduced into the autoclave in the usual manner.

By operating the urea synthesis step under conditions resulting in the production of an autoclave effluent containing 7 mols or more ammonia to every 1 mol. carbon dioxide, the ammonia and carbon dioxide may be vaporized from the efficient and condensed to form directly a slurry containing less than 50% carbamate. When the effluent contains a lower proportion of ammonia to carbon dioxide it is particularly advantageous to pass the vaporized ammonia and carbon dioxide into contact with cool, liquid ammonia to condense the gases as a slurry containing the desired proportion of ammonium carbamate. If more ammonia is present in condensing the unconverted ammonia and carbon dioxide than it is desired to introduce into the autoclave, a part of the ammonia may be removed from the slurry of ammonium carbamate before it is introduced into the autoclave. Similarly, any additional ammonia which it is desired to introduce into the autoclave over that in the carbamate slurry as it is initially formed may be mixed with the slurry before introducing it into the autoclave.

By employing the procedure of this invention, a continuous process for production of urea may be carried out with difficulties previously encountered in return of unreacted reactants to the urea autoclave obviated. The slurry is strongly ammoniacal and is sufficiently fluid to be pumped at ordinary temperatures, thus eliminating problems in handling and corrosion inherent in previous processes. The use of liquid ammonia as the medium for forming the slurry which is introduced into the autoclave results in the introduction of no extraneous material or return of substantial amounts of the synthesis reaction products to impair the efficiency of operation of the autoclave.

In a preferred procedure for practicing this invention, urea is continuously formed in an autoclave by reaction of carbon dioxide and ammonia at urea-forming pressures and temperatures. Liquid ammonia and liquid carbon dioxide are continuously supplied to the autoclave and liquid effluent is continuously withdrawn therefrom. This effluent is passed to a stripper in which it is heated under a lower pressure than that in the autoclave, preferably at about 10 atmospheres, to volatilize unconverted ammonia and carbon dioxide. The ammonia and carbon dioxide vaporized from the effluent, accompanied by but little water vapor, are condensed in cool, liquid ammonia to form a slurry of fine particles of solid ammonium carbamate in the liquid ammonia. In order to remove heat of condensation, it is desirable to circulate the slurry formed by condensation of ammonia and carbon dioxide to a cooler and thence back to the condenser for further contact with ammonia and carbon dioxide vapors, a portion of the circulating slurry being continuously withdrawn and pumped to the autoclave for further synthesis of urea. Liquid ammonia is continuously supplied to the slurry recirculated in contact with the vapors to maintain the proportion of carbamate in the slurry below 50%, if the proportion of ammonia to carbon dioxide condensed from the gas is insufficient to produce a slurry containing this proportion of carbamate. The amount of water in the slurry, both that condensed with the carbon dioxide and ammonia and that which may be in the liquid ammonia introduced into contact with the gases, is limited to an amount insufficient to introduce more than 10% H₂O into the carbamate slurry formed in condensing the ammonia and carbon dioxide.

Liquid withdrawn from the stripper where ammonia and carbon dioxide are volatilized from autoclave effluent contains principally urea and water and may contain residual ammonia and carbon dioxide not removed by the stripper. Separation of these components may be accomplished continuously by distillation and fractionation. Ammonia thus recovered may be returned to the urea synthesis autoclave and the urea withdrawn as product.

The invention is further described and illustrated by the following examples and accompanying drawing:

Figs. 1 and 2 of the drawing show diagrammatically two procedures for employing the process of my invention for treating liquid effluent from a urea autoclave.

In Fig. 1 of the drawing, 1 represents a pump for supplying liquid carbon dioxide to a urea synthesis autoclave 2, 3 a preheater for the carbon dioxide and 4 a preheater for the slurry of ammonium carbamate in liquid ammonia hereinafter described. A pressure stripper 5 is a column provided with a heater in which liquid effluent from the autoclave is heated to volatilize unreacted carbon dioxide and ammonia, the carbon dioxide and ammonia vapors being contacted in a condenser 6 with liquid ammonia to condense the vapors to solid ammonium carbamate. The slurry thus formed is circulated by pump 7 through cooler 8 back to condenser 6. A portion of the slurry is withdrawn and pumped by the slurry pump 9 to the slurry preheater 4 and thence to the autoclave. Make-up ammonia is introduced into the slurry passing through cooler 8 to condenser 6.

In carrying out the process illustrated in Fig. 1, a slurry of ammonium carbamate in liquid ammonia containing about 29% ammonium carbamate by weight is preheated in heater 4 before being introduced into autoclave 2. In preheating the slurry, its temperature may be raised high enough (above 118° C.) to liquefy it. Liquid carbon dioxide is passed through preheater 3 by the pump 1 to autoclave 2 in the proportions of about 38 parts by weight of carbon dioxide to every 100 parts of the carbamate slurry in order to maintain a ratio of about 4NH₃ to 1CO₂ in the autoclave. In the autoclave the reaction mixture is maintained at a pressure of about 250 atmospheres by means of pumps 1 and 9 and is brought to a temperature of about 190° C. whereby about 70% of the carbon dioxide is converted to urea. The autoclave effluent then passes to the pressure stripper 5 operated at about 10 atmospheres pressure where unconverted ammonia and carbon dioxide are volatilized. The vaporized ammonia and carbon dioxide are passed into condenser 6 and there contacted with a slurry of ammonium carbamate in liquid ammonia, whereby the ammonia and carbon dioxide are condensed to form solid ammonium carbamate. Slurry is circulated through cooler 8 and returned to the condenser to condense more carbon dioxide and ammonia, while a portion of the slurry, corresponding in amount to the ammonia and carbon dioxide condensed in the condenser and the make-up ammonia supplied to the slurry, is withdrawn and pumped to the slurry preheater 4. The ammonia and carbon dioxide are vaporized from the liquid in stripper 6 in the proportions of about 11 mols ammonia to 1 mol carbon dioxide. When condensed such a mixture would form a composition containing about 34% ammonium carbamate and 66% liquid ammonia.

Sufficient make-up liquid ammonia is, however, introduced to maintain about 29% ammonium carbamate in the circulating slurry.

Liquid withdrawn from the pressure stripper consists principally of urea and water with small amounts of residual ammonia and carbon dioxide.

The process described above may be modified in many respects. For example, pressure and temperature conditions within the autoclave may be varied and the synthesis may be carried out with an excess of either ammonia or carbon dioxide in the autoclave, although a ratio of ammonia to carbon dioxide within the range 2:1 to 4:1 is preferable. Stripper 5 may be operated at pressures of from 1 to 20 atmospheres, although a pressure range of 4 to 12 atmospheres is preferable. The vapors leaving stripper 5 may be dehydrated before entering condenser 6 by bringing them into contact with a small amount of liquid ammonia, urea or other suitable dehydrating agent which is not introduced into the urea autoclave after being used to absorb water. The amount of water returned to the autoclave is thereby reduced and efficiency of urea formation increased.

When the autoclave is operated with a sufficient excess of ammonia that the ratio of ammonia to carbon dioxide in the vapors evolved from the stripper is high enough for them to be condensed to form directly a slurry of proper fluidity, make-up ammonia need not be introduced into the slurry of carbamate contacted with the gases in condenser 6. Instead, the make-up ammonia may be fed directly to the autoclave or may be added to the slurry on its way to the autoclave.

Under some conditions of operation it may be desirable to supply more liquid ammonia to the condenser for slurry formation than is required as make-up ammonia. Under these circumstances a part of the excess ammonia may be withdrawn from the slurry before it is returned to the autoclave, by filtration or decantation for example.

With reference to Fig. 2, the process there illustrated involves treating ammonia and carbon dioxide at urea synthesis temperatures and pressures in a urea autoclave 20. The ammonia and carbon dioxide are introduced into the autoclave in the proportions of 200 mols $NH_3$ for every 100 mols $CO_2$. From the autoclave there is drawn a synthesis product or autoclave effluent which is introduced into a stripper 21 where it is heated at pressures materially below those maintained in autoclave 20 to vaporize ammonia and carbon dioxide from it. About 112 mols of ammonia and 56 mols of carbon dioxide are vaporized from the urea autoclave effluent in the stripper and passed into a condenser 22 where the gases are cooled by direct contact with about 287 to 487 mols of liquid ammonia. The ammonia and carbon dioxide are condensed to form a slurry of ammonium carbamate in liquid ammonia which is drawn from condenser 22 and by means of a pump 23 is raised to the urea synthesis pressures maintained in autoclave 20. From pump 23 the slurry passes through a heater 24 where it is heated to 120° C. At that temperature the slurry is liquefied. The liquefied slurry is passed to a separator 25 in which the liquid forms two layers; an upper layer consisting of liquid ammonia containing about ½% carbon dioxide (equivalent to about 1% ammonium carbamate) and a lower layer consisting of a solution of ammonium carbamate in liquid ammonia. From the top of separator 25 about 200 to 400 mols of liquid ammonia containing 1 to 2 mols of carbon dioxide are drawn and, after cooling in a cooler 26, introduced into the top of condenser 22. About 88 mols of liquid ammonia are also supplied to condenser 22 in addition to that drawn from separator 25. The solution of ammonium carbamate in liquid ammonia which may contain, for example, 200 mols of $NH_3$ and 56 mols of $CO_2$, is drawn from the bottom of separator 25 and passed to urea autoclave 20. There is also supplied to autoclave 20 about 44 mols of liquid carbon dioxide.

In the process of this example there is continuously fed to the urea synthesis process about 2 mols of ammonia for every 1 mol of carbon dioxide and urea synthesized therefrom. The unconverted ammonia and carbon dioxide are vaporized from the urea autoclave effluent and condensed to form a slurry of carbamate in liquid ammonia containing a much higher proportion of ammonia to carbon dioxide than is employed in the urea synthesis step. By preparing such a slurry it may be pumped readily to the higher urea synthesis pressure and thereafter the excess ammonia separated from the ammonium carbamate before the latter is returned to the urea autoclave.

Where reference is made in this specification and appended claims to the formation of urea from ammonia and carbon dioxide, it is understood the words "ammonia and carbon dioxide" are intended to include compounds of $NH_3$ and $CO_2$ such as ammonium carbamate and compounds of $NH_3$, $CO_2$ and $H_2O$ such as ammonium carbonate and ammonium bicarbonate.

I claim:

1. The process for transferring a mixture of ammonia and carbon dioxide from a lower to a higher pressure which comprises condensing at the lower pressure said mixture of ammonia and carbon dioxide from the vapor state in the presence of liquid ammonia to form a slurry of ammonium carbamate in liquid ammonia, and pumping said slurry to the higher pressure.

2. The process for transferring a mixture of ammonia and carbon dioxide from a lower to a higher pressure which comprises condensing at the lower pressure and at a temperature not substantially above 118° C. said mixture of ammonia and carbon dioxide from the vapor state in the presence of liquid ammonia to form a slurry of ammonium carbamate in liquid ammonia containing less than 50% ammonium carbamate, and pumping said slurry to the higher pressure.

3. In a process for synthesis of urea by subjecting ammonia and carbon dioxide to urea-forming temperatures and high pressures, the steps which comprise condensing a mixture of ammonia and carbon dioxide in the presence of liquid ammonia to form a slurry of ammonium carbamate in liquid ammonia, and pumping said slurry from a lower pressure to a higher urea synthesis pressure under which ammonia and carbon dioxide contained in the slurry are reacted to form urea.

4. In a continuous process for the production of urea by subjecting ammonia and carbon dioxide to urea-forming temperatures in a high pressure urea synthesis system and heating the effluent from said system under a lower pressure to volatilize unreacted ammonia and carbon dioxide from the effluent for return to the high pressure urea synthesis system, the improvement which comprises condensing the evolved mixture of ammonia and carbon dioxide gases in the presence of liquid ammonia to form a slurry of ammonium carbamate in the liquid ammonia containing less than 50% ammonium carbamate, and pumping the slurry thus formed into the high pressure urea synthesis system for reaction therein of the ammonia and carbon dioxide contained in the slurry to form urea.

5. In a continuous process for production of urea by subjecting ammonia and carbon dioxide to urea-forming temperatures and high pressures in an autoclave, the steps which comprise heating liquid effluent from the autoclave under a pressure of from 1 to 20 atmospheres to volatilize unreacted ammonia and carbon dioxide, contacting under said pressure of 1 to 20 atmospheres the mixture of gaseous ammonia and carbon dioxide evolved from said effluent with liquid ammonia containing ammonium carbamate in suspension to condense the ammonia and carbon dioxide and form a slurry of solid ammonium carbamate in liquid ammonia, recycling slurry thus formed into renewed contact with said mixture of gaseous ammonia and carbon dioxide and cooling the slurry to remove the heat absorbed in condensing ammonia and carbon dioxide therein, maintaining in the slurry sufficient ammonia so that the slurry contains less than 50% ammonium carbamate, continuously withdrawing a portion of the slurry and pumping the withdrawn portion from said pressure of 1 to 20 atmospheres to the higher urea synthesis pressure maintained in said autoclave and reacting the ammonia and carbon dioxide contained in the slurry in said autoclave to form urea.

6. In a continuous process for production of urea by subjecting ammonia and carbon dioxide to urea-forming temperatures and high pressures in an autoclave, the steps which comprise heating liquid effluent from the autoclave under a pressure of from 4 to 12 atmospheres to volatilize unreacted ammonia and carbon dioxide, contacting under said pressure of 4 to 12 atmospheres the mixture of gaseous ammonia and carbon dioxide evolved from said effluent with liquid ammonia containing ammonium carbamate in suspension to condense the ammonia and carbon dioxide and form a slurry of solid ammonium carbamate in liquid ammonia, recycling slurry thus formed into renewed contact with said mixture of gaseous ammonia and carbon dioxide and cooling the slurry to remove the heat absorbed in condensing ammonia and carbon dioxide therein, continuously withdrawing a portion of the slurry and pumping the withdrawn portion from said pressure of 4 to 12 atmospheres to the higher urea synthesis pressure maintained in said autoclave and reacting the ammonia and carbon dioxide contained in the slurry in said autoclave to form urea while supplying make-up ammonia and carbon dioxide by introducing liquid ammonia into the slurry contacted with said mixture of gaseous ammonia and carbon dioxide and introducing carbon dioxide into said autoclave.

7. In a process for the synthesis of urea in which ammonia and carbon dioxide are subjected to urea-forming temperatures and high pressures in a urea synthesis autoclave and ammonia and carbon dioxide unconverted to urea are recovered from the urea autoclave effluent as a mixture of gaseous ammonia and carbon dioxide, the improvement which comprises condensing said unconverted ammonia and carbon dioxide in contact with liquid ammonia to form a slurry of solid ammonium carbamate in liquid ammonia, pumping said slurry from the pressure at which it is produced to the higher urea-forming pressure maintained in said autoclave, heating said slurry to a temperature above 118° C. to liquefy it, separating from the liquefied slurry a portion of the liquid ammonia present therein and returning the remaining portion of the liquefied slurry to said urea synthesis.

8. In a continuous process for the synthesis of urea in which ammonia and carbon dioxide are subjected to urea-forming temperatures and high pressures in a urea synthesis autoclave and ammonia and carbon dioxide unconverted to urea are recovered from the urea autoclave effluent as a mixture of gaseous ammonia and carbon dioxide, the improvement which comprises condensing said unconverted ammonia and carbon dioxide in contact with liquid ammonia to form a slurry of solid ammonium carbamate in liquid ammonia, pumping said slurry from the pressure at which it is produced to the higher urea-forming pressure maintained in said autoclave, heating said slurry to a temperature above 118° C. to liquefy it, separating from the liquefied slurry a portion of the liquid ammonia present therein, returning the remaining portion of the liquefied slurry to said urea synthesis autoclave together with sufficient make-up carbon dioxide to maintain a ratio of about 2 mols ammonia to 1 mol carbon dioxide in the reaction mixture treated for the synthesis of urea and returning into contact with said unconverted ammonia and carbon dioxide the portion of liquid ammonia separated from the liquefied slurry together with make-up liquid ammonia supplied for reaction with said make-up carbon dioxide.

FRANK PORTER.